I. W. SWALLOW.

Assignor to THE AMERICAN WATER BAR GRATE COMPANY.

GRATE BAR FOR LOCOMOTIVES, &c.

No. 10,700. Reissued Mar. 16, 1886.

WITNESSES

B. Fugitt,
Phil. C. Masi.

INVENTOR

Isaac W. Swallow
by Anderson & Smith
his ATTORNEYS.

N. PETERS, Photo-Lithographer, Washington, D. C.

UNITED STATES PATENT OFFICE.

ISAAC W. SWALLOW, OF KINGSTON, PENNSYLVANIA, ASSIGNOR TO THE AMERICAN WATER BAR GRATE COMPANY.

GRATE-BAR FOR LOCOMOTIVES, &c.

SPECIFICATION forming part of Reissued Letters Patent No. 10,700, dated March 16, 1886.

Original No. 288,599, dated November 13, 1883. Application for reissue filed November 9, 1885. Serial No. 182,315.

*To all whom it may concern:*

Be it known that I, ISAAC W. SWALLOW, a citizen of the United States, a resident of Kingston, in the county of Luzerne and State of Pennsylvania, have invented certain new and useful Improvements in Grate-Bars for Locomotives, &c.; and I do hereby declare the following is a full, clear, and exact description of the invention, that will enable others skilled in the art to which it appertains to make and use the same, reference being had to the accompanying drawings, and to the letters of reference marked thereon, which form a part of this specification.

Figure 1:
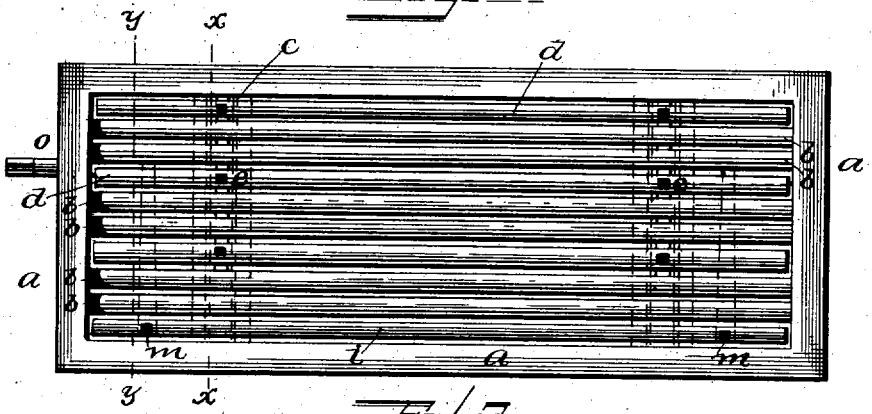
Figure 2:
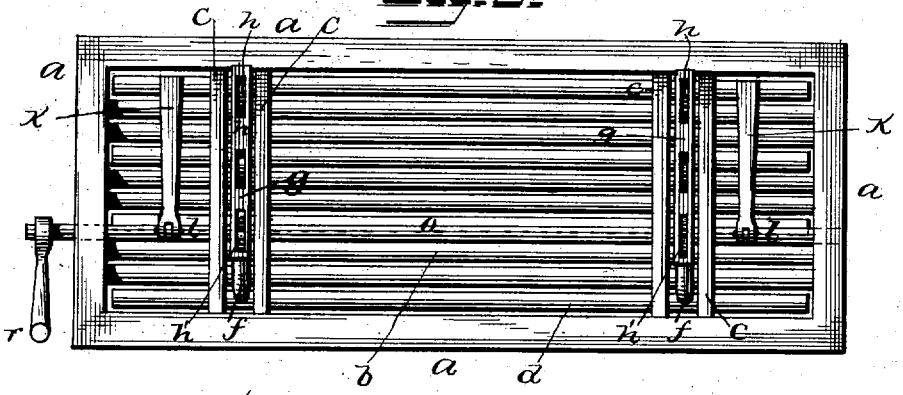
Figure 3:
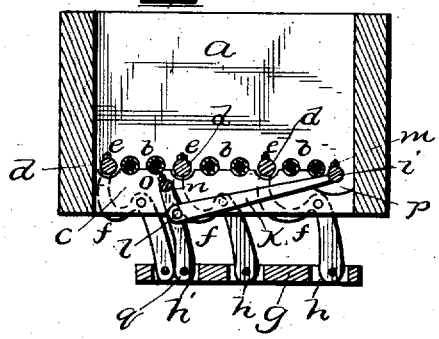
Figure 4:
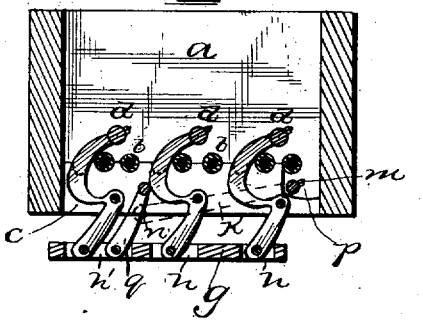

Figure 1 of the drawings is a representation of a plan view of my grate-bar attachment. Fig. 2 is a bottom view of the same. Fig. 3 is a cross-section on line *y y* in Fig. 1, and Fig. 4 is a cross-section on line *x x* in Fig. 1. These two figures show the closed and open grate.

This invention has relation to grate-bars; and it consists in the construction and novel arrangement of devices, as will be hereinafter more fully described, and particularly pointed out in the claims appended.

The objects of the invention are to produce a grate for locomotive-engines that, while serving as a grate, may at the same time be operated to clean and remove the ashes from the bottom of the fire without injuring or weakening the fire, and without the necessity of opening the fire-box, and while the engine is raising steam, thus preventing a wasting of the volume of heat in the furnace and a reduction of the amount of steam while cleaning and renewing the fire; in so arranging the tumbler-bars that the fire may be cleaned along the side walls and in the corners as well as in the middle of the fire-box, thereby enabling the operator to keep the fire at the sides and corners in the same condition as in the middle, which is of great importance from the fact that there is where the greatest amount of steam is generated, because nearer to the water-pipes, and the place under the present system where the fire dies out first and is most difficult to renew.

Referring by letter to the accompanying drawings, *a* designates the fire-box, which is rectangular in form, and is provided with the stationary hollow longitudinal water-bars *b b*, arranged in pairs in the end walls of the fire-box and resting on pairs of intermediate cross-bars, *c c*, near the bottom of the fire-box.

*d d d* are the tumbler-bars, which are free at their ends, and are connected intermediately by bolts and nuts *e* to the upper ends of curved arms *f f*, pivoted in bearings between the cross-bars *c c*. The tumbler-bars *d* are of solid wrought-iron, are smaller than the bars *b b*, and rest when in their normal position in notches in the upper edges of the cross-bars *c c*, on a level slightly lower than that of the water-bars, in order that the latter may protect them from being so rapidly burned out as they would otherwise be. The lower ends of the pivoted arms *f* are straight, and are connected by slotted bars *g g*, their ends being pivoted in the slots *h h* and *h'* by nut-bolts. The upper ends of the pivoted arms *f* are curved, as shown, so that when the tumbler-bars *d* are raised they will come directly over the space between the water-bars of each pair.

At one side of the grate a tumbler-bar, *i*, is arranged to be drawn under the water-bar *b* next to it, instead of being raised over, as the other tumbler-bars, *d*, are, for the reason that the single bar *i* would not operate if connected to a pivoted arm, as the others are, the side wall of the fire-box at that side being in the way. The single bar *i* is therefore connected to two inclined transverse arms, *k k*, near its ends, by nut-bolts *l*, and these arms *k k* are connected at their other ends by nut-bolts *m* to short rigid arms *n n*, depending from the shaking-rod *o*, which has bearings in the end walls of the fire-box and in the transverse cross-bars *c c*. The notches *p* for the single bar *i* are longer and deeper than those for the bars *d*, so that the single bar *i* can be drawn under its bar *b* when the grate is shaken. The shaking-rod *o* is also provided with arms *q q*, which depend through the spaces between the adjacent cross-bars *c c*, and are pivoted by nut-bolts in the slots *h* of the slotted connecting-bars *g g*, so that all of the tumbler-bars are operated at one and the same time by means of the shaking-lever *r*, adapted to fit the projecting end of the shaking-rod *o*. The heads of the nut-bolts that secure the tumbler-bars to their respective arms rest in countersinks in the top sides of said bars, making the top surface of the grate smooth, and also shielding the thread and nut from exposure to the fire.

It will be seen that the construction is so simplified and arranged that in case any part becomes worn out or broken it will take but a few minutes' work to replace it with a new one, as it is only necessary to take off two or three nuts and remove the bolts to get out any part of the several pieces. The fire can be stirred or cleaned while the locomotive is in motion without reducing the amount of steam. By this construction there is a saving in time and labor, as the whole operation is performed in a few minutes by the use of the shaking-lever. It saves the furnace-man or operator from a great deal of exposure to the fire, and obviates the danger now experienced by so many persons having their faces, eyes, hair, hands, and clothing burned while cleaning and renewing the fire, as it dispenses with the necessity of opening the fire-box door, except to add fuel. It will work in hard or soft coal burners, and will save fuel, an item of the greatest importance at the present time, as it removes the ashes only, and saves the good fire and unburned coal, which by the present method is mostly wasted, from the fact that first one end is knocked out and cleaned with a poker and slash-bar, then the other end is subjected to the same operation, taking ashes, fire, and unburned fuel all together, thus causing great waste, which, until my improvement, could not be avoided.

Having thus fully described my invention, what I claim as new, and desire to secure by Letters Patent, is—

1. A fire-grate for locomotive fire-boxes, consisting of a series of water-bars and movable tumbler-bars extending longitudinally of the fire-box, beside and parallel with the water-bars, curved levers, and a bar pivoted to the lower ends of the curved levers, whereby the said tumbler-bars may be raised on curvilinear lines, substantially as specified.

2. The combination, with a fire-box, of a series of grate-bars and a series of tumbler-bars, which are approximately on the same horizontal plane in their normal positions, a bar beneath the grate and tumbler bars, and levers having curved extensions pivotally connecting the tumbler-bars with the said lower bar and passing between the grate-bars, substantially as specified.

3. The combination, with the pairs of water-bars *b b* and notched cross-bars *c c*, of the tumbler-bars *d d d*, pivoted curved arms *f*, the slotted connecting-bars *g g*, shaking-rod *o*, the single tumbler-bar *i*, the inclined transverse arms *k k*, the rigid arms *n n* on the shaking-rod, and arms *q q*, connecting the rod *o* and the connecting-bars *g g*, substantially as specified.

4. A fire-grate for fire-boxes, consisting of a series of stationary bars and movable tumbler-bars extending longitudinally of the fire-box, beside and parallel with the stationary bars, a shaking-rod, curved connections, and means for connecting the shaking-rod with said curved connections, to raise and lower said tumbler-bars on curvilinear lines, as specified.

In testimony whereof I affix my signature in presence of two witnesses.

ISAAC W. SWALLOW.

Witnesses:

GEO. H. BUTLER,

C. W. BOONE.